(12) United States Patent
Hagiwara

(10) Patent No.: US 11,442,613 B2
(45) Date of Patent: Sep. 13, 2022

(54) ELECTRONIC APPARATUS, CONTROL METHOD OF ELECTRONIC APPARATUS, AND NON-TRANSITORY COMPUTER READABLE MEDIUM

(71) Applicant: CANON KABUSHIKI KAISHA, Tokyo (JP)

(72) Inventor: Shinichi Hagiwara, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 57 days.

(21) Appl. No.: 17/063,968

(22) Filed: Oct. 6, 2020

(65) Prior Publication Data

US 2021/0103343 A1 Apr. 8, 2021

(30) Foreign Application Priority Data

Oct. 7, 2019 (JP) .............................. JP2019-184450

(51) Int. Cl.
*G06F 3/04855* (2022.01)
*G06F 3/0354* (2013.01)
(Continued)

(52) U.S. Cl.
CPC .......... *G06F 3/04855* (2013.01); *G06F 3/038* (2013.01); *G06F 3/03543* (2013.01); *G06F 3/0412* (2013.01); *G06F 3/0482* (2013.01)

(58) Field of Classification Search
CPC .. G06F 3/04855; G06F 3/03543; G06F 3/038; G06F 3/0412; G06F 3/0482
See application file for complete search history.

(56) References Cited

U.S. PATENT DOCUMENTS 8,812,977 B2 * 8/2014 Naderi .................. G06F 16/972
715/787
2010/0056221 A1 * 3/2010 Park ...................... G06F 3/0482
455/566
(Continued)

FOREIGN PATENT DOCUMENTS

JP 2013-175214 A 9/2013
JP 6040721 B2 * 12/2016

OTHER PUBLICATIONS

Ahlberg, C., & Shneiderman, B. (Apr. 1994). The alphaslider: a compact and rapid selector. In Proceedings of the SIGCHI conference on Human factors in computing systems (pp. 365-371). (Year: 1994).*

*Primary Examiner* — James T Tsai
(74) *Attorney, Agent, or Firm* — Cowan, Liebowitz & Latman, P.C.

(57) ABSTRACT

An electronic apparatus according to the present invention performs control such that a change in a first designation mode is performed in accordance with reception of a first type of operation without moving an input position in a predetermined region, wherein in the change, a specific change target is changed to a change destination that corresponds to a region to which the input position in the first type of operation belongs, and a change in a second designation mode is performed in accordance with reception a second type of operation of moving the input position in the predetermined region, wherein in the change, the specific change target is changed to a change destination that differs, by a change amount based on a movement amount in the second type of operation, from the change destination that is changed in the first type of operation.

18 Claims, 8 Drawing Sheets

(51) Int. Cl.
*G06F 3/038* (2013.01)
*G06F 3/0482* (2013.01)
*G06F 3/041* (2006.01)

(56) References Cited

U.S. PATENT DOCUMENTS

2011/0122159 A1* 5/2011 Bergsten ............. G06F 3/04886
  345/684
2014/0215386 A1* 7/2014 Song .................... G06F 3/0488
  715/787
2018/0032215 A1* 2/2018 Rao ...................... G06F 3/0482
2020/0326824 A1* 10/2020 Alonso ................. G06F 3/0486

* cited by examiner

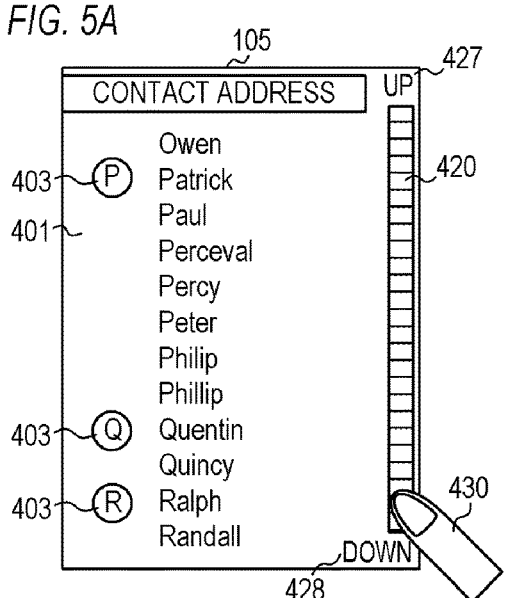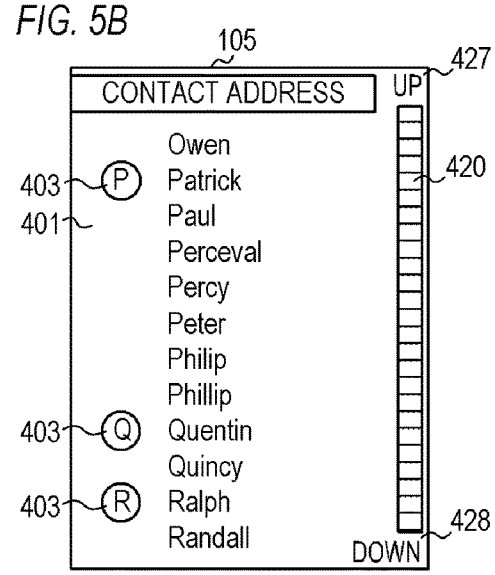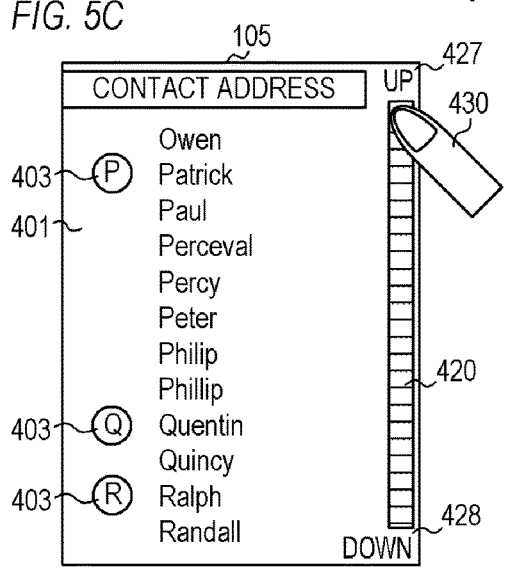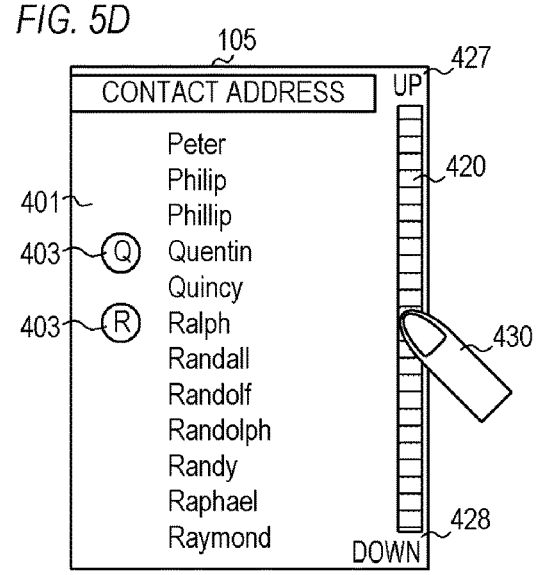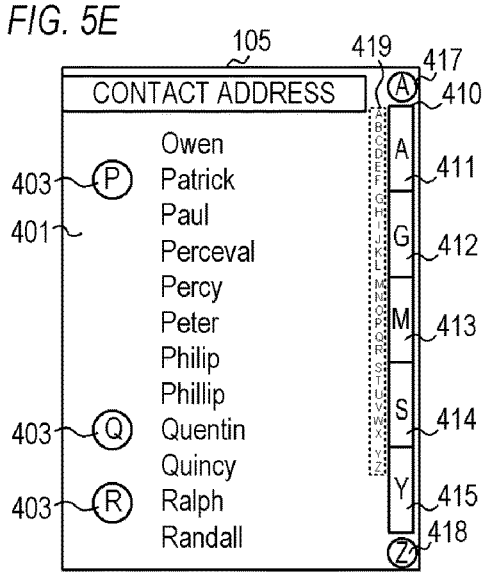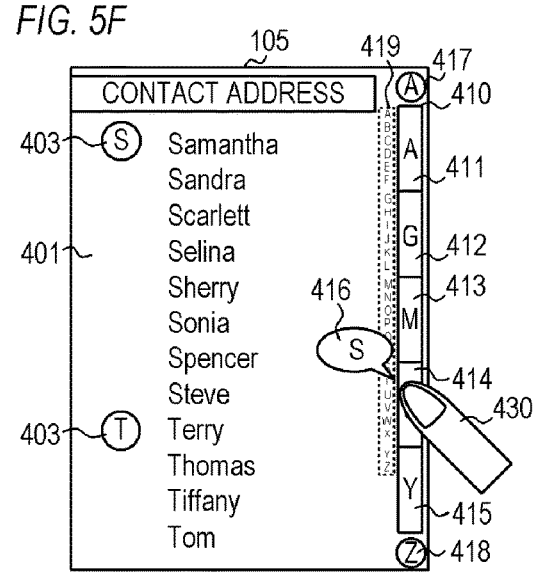

ELECTRONIC APPARATUS, CONTROL METHOD OF ELECTRONIC APPARATUS, AND NON-TRANSITORY COMPUTER READABLE MEDIUM

BACKGROUND OF THE INVENTION

Field of the Invention

The present invention relates to an electronic apparatus, and more particularly to a method of control in accordance with a moving operation which involves moving an operating body.

Description of the Related Art

As an operation method for an electronic apparatus, an operation method that uses a pointing device, such as a mouse, a touch panel and a touch pad, has been proposed. For an operation of such a pointing device, it has been proposed that, when a user changes a change target to a target change destination, the user be allowed to perform both rough and quick adjustment and detailed fine adjustment to implement the change quickly and with certainty. Japanese Patent Application Publication No. 2013-175214 discloses that if the user performs dragging after touch, a moving amount (change amount) of a frame displayed is changed in accordance with the moving amount of dragging. To be more specific, it is proposed that both the rough and quick adjustment and the detailed fine adjustment can be performed by changing an amount of feeding data on the moving amount of dragging in the horizontal direction in accordance with a position of touching to a touch panel in the virtual direction.

However in the prior art disclosed in Japanese Patent Application Publication No. 2013-175214, the position of touching in the vertical direction has to be changed depending on whether a fine adjustment is performed or a major change is performed in the change operation on the change target, and this operation is an operation that is not necessarily performable intuitively for the user.

SUMMARY OF THE INVENTION

The present invention allows rough designation and fine adjustment to be performed, with better operability, on a change destination of a change target.

An electronic apparatus according to the present invention, includes:

a receiver configured to receive an input operation of a position; and at least one memory and at least one processor which function as:

a control unit configured to perform control such that a change in a first designation mode is performed in accordance with that the receiver receives a first type of operation without moving an input position in a predetermined region, wherein in the change in the first designation mode, a specific change target is changed to a change destination that corresponds to a region to which the input position in the first type of operation belongs, and a change in a second designation mode is performed in accordance with that the receiver receives a second type of operation of moving the input position in the predetermined region, wherein in the change in the second designation mode, the specific change target is changed to a change destination that differs, by a change amount based on a movement amount in the second type of operation, from the change destination that is changed in the first type of operation, wherein in the first designation mode, the specific change target is changed to a first change destination in accordance with reception of the first type of operation for a first divided region in the predetermined region, and in accordance with reception of the first type of operation for a second divided region, which is adjacent to the first divided region in a first direction side in the predetermined region, the specific change target is changed to a second change destination, which is located on the first change direction side of the first change destination, and in the second designation mode, in accordance with reception of the second type of operation of moving the input position in the first direction from a state, where the first type of operation for the first divided region is received and where the specific change target is changed to the first change destination, the specific change target is changed to a third change destination, which is located on the first change direction side of the first change destination and on a second change direction side of the second change destination, the second change direction side being opposite to the first change direction side.

Further features of the present invention will become apparent from the following description of exemplary embodiments with reference to the attached drawings.

BRIEF DESCRIPTION OF THE DRAWINGS

FIG. 5A to FIG. 5F are display examples to designate a position;

DESCRIPTION OF THE EMBODIMENTS

Figure 1:
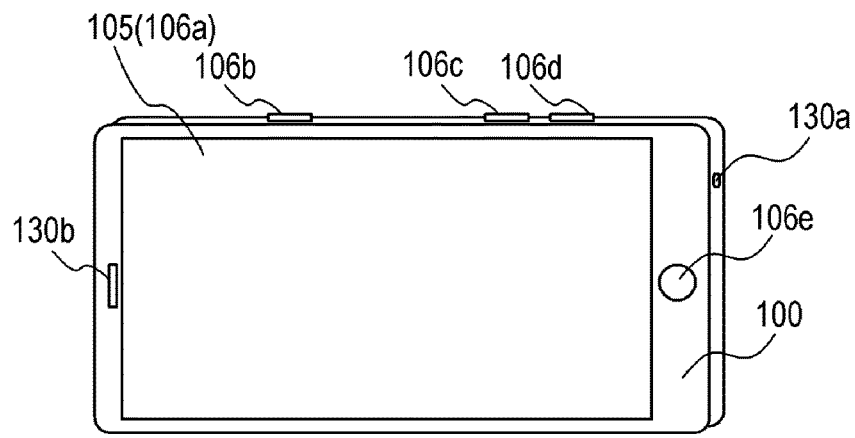
FIG. 1 is an external view of an electronic apparatus (smartphone)

Embodiments of the present invention will be described in detail with reference to the accompanying drawings. FIG. 1 is an example of an external view of an electronic apparatus 100. The electronic apparatus 100 is a smartphone, for example, but may be a personal computer (PC), tablet PC, digital camera or the like. A display 105 of the electronic apparatus 100 is a display unit that displays images and various information. The display 105 is integrated with a touch panel 106a, as described later, so that touch operation to the display surface of the display 105 can be detected. A live view image captured by a camera unit disposed on the rear surface side (opposite side of the display surface side (illustrated side)) of the electronic apparatus 100, and the reproduced images of the captured images can be displayed on the display 105. An operation unit 106 includes the touch panel 106a, and operation units 106b, 106c, 106d and 106e.

The operation unit 106b is a power button which receives an operation to switch ON/OFF of the power supply of the electronic apparatus 100. The operation units 106c and 106d are volume buttons to adjust the volume of the sound outputted from a sound output unit, such as a speaker 130b. The operation unit 106e is a home button to display a home screen on the display 105. A sound output terminal 130a is an earphone jack, and is a terminal to output sound to an earphone, external speaker or the like. The speaker 130b is an internal speaker of the main unit to output sound.

Figure 2:
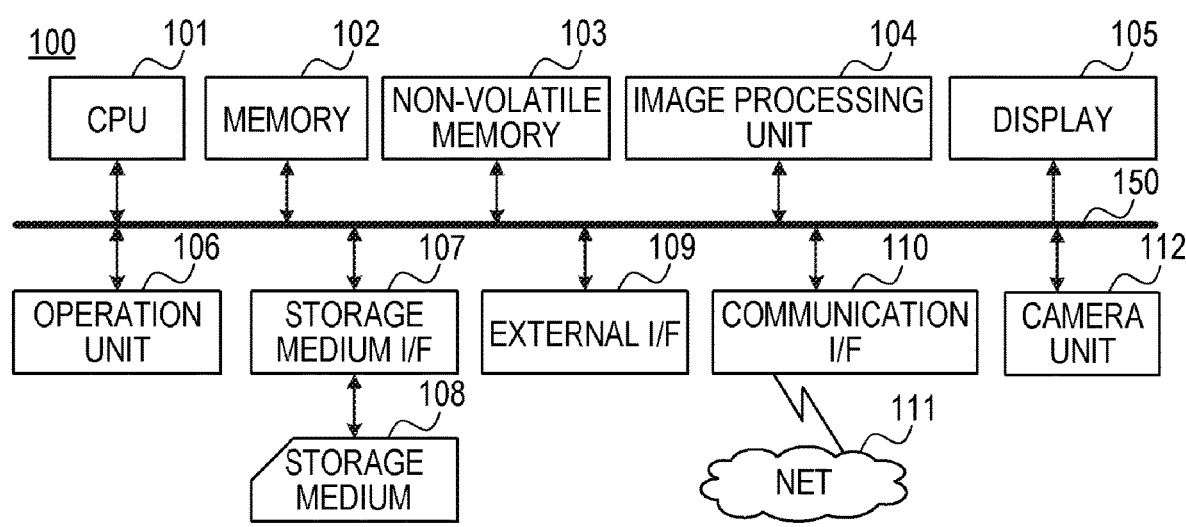
FIG. 2 is a block diagram of the electronic apparatus.

FIG. 2 is an example of a configuration of the electronic apparatus 100. A CPU 101, memory 102, non-volatile memory 103, image processing unit 104, display 105, operation unit 106, storage medium I/F 107, external I/F 109, communication I/F 110 and camera unit 112 are connected to an internal bus 150.

The CPU 101 is a control unit that controls the electronic apparatus 100 in general, and includes at least one processor or circuit. The memory 102 is a RAM (e.g. volatile memory using semiconductor elements), for example. The CPU 101 controls each unit of the electronic apparatus 100 in accordance with the program stored in the non-volatile memory 103, for example, using the memory 102 as a work memory. In the non-volatile memory 103, image data, sound data, other data, various programs for the CPU 101 to execute and the like are stored. The non-volatile memory 103 is constituted of a flash memory, ROM or the like.

Based on the control of the CPU 101, the image processing unit 104 performs various image processing operations on images stored in the non-volatile memory 103 and the storage medium 108, video signals acquired via the external I/F 109, and images acquired via the communication I/F 110. The image processing performed by the image processing unit 104 includes A/D conversion processing, D/A conversion processing, encoding processing of image data, compression processing, decoding processing, magnifying/demagnifying processing (resizing), noise reduction processing and color conversion processing. The image processing unit 104 may be configured as a dedicated circuit block to perform specific image processing. Depending on the type of the image processing, the CPU 101 may perform image processing according to a program without using the image processing unit 104.

Based on the control of the CPU 101, the display 105 displays, for example, images and a GUI screen constituting the graphical user interface (GUI). The CPU 101 generates a display control signal in accordance with the program, and controls each unit of the electronic apparatus 100 so that video signals, to be displayed on the display 105, are generated and outputted to the display 105. The display 105 displays the image based on the outputted video signals. The configuration of the electronic apparatus 100 itself may be subject to the interface to output the video signals to be displayed on the display 105, and the display 105 may be configured as an external monitor (e.g. TV).

The operation unit 106 is an input device (receiver) that receives user operations, and includes a text information input device (e.g. keyboard), a pointing device (e.g. mouse, touch panel), buttons, dials, joystick, touch sensor, touch pad and the like. The touch panel is an input device configured as a plane which is superimposed on the display 105, so that coordinate information corresponding to the contacted position is outputted.

The storage medium I/F 107, to which a storage medium 108 (e.g. memory card) is installed, reads data from the installed storage medium 108 or writes data to this storage medium 108 based on the control of the CPU 101. The external I/F 109 is an interface that is connected to an external apparatus wirelessly or via cable, so as to input/output video signals and sound signals. The communication I/F 110 is an interface that communicates with an external apparatus, Internet 111 or the like, so as to transmit/receive various data, such as files and commands.

The operation unit 106 includes the touch panel 106a. The CPU 101 can detect the following operations on the touch panel 106a or the state thereof.

A finger or pen which is not touching the touch panel 106a touches the touch panel 106a, that is, touch is started (hereafter Touch-Down)

A finger or pen is touching the touch panel 106a (hereafter Touch-On)

A finger or pen is moving in the state of touching the touch panel 106a (hereafter Touch-Move)

A finger or pen, which is touching the touch panel 106a, is released from the touch panel 106a, that is, touch is ended (hereafter Touch-Up)

Nothing is touching the touch panel 106a (hereafter Touch-Off)

When Touch-Down is detected, Touch-On is also detected at the same time. Unless Touch-Up is detected after Touch-Down, Touch-On is normally detected continuously. When Touch-Move is detected as well, Touch-On is detected at the same time. Even if Touch-On is detected, Touch-Move is not detected unless the touch position is moving. Touch-Off is detected when Touch-Up of all fingers or pen is detected.

These operations, states and positional coordinates where a finger or pen is touching the touch panel 106a are notified to the CPU 101 via an internal bus, and based on the notified information, the CPU 101 determines the kind of operation (touch operation) that was performed on the touch panel 106a. For Touch-Move, the CPU 101 can also determine the moving direction of the finger or pen moving on the touch panel 106a, based on the change of the positional coordinates, for the horizontal components and the vertical components on the touch panel 106a respectively. If Touch-Move is detected for at least a predetermined distance, the CPU 101 determines that the slide operation was performed. An operation of quickly moving a finger on the touch panel 106a for a certain distance in the touching state and releasing the finger is called "flick". In other words, flick is an operation of moving and releasing the finger rapidly on the touch panel 106a. If Touch-Move is detected for at least a predetermined distance at a predetermined speed or faster, the CPU 101 then determines that flick was performed (determines that flick was performed after the slide operation). Further, a touch operation of touching a plurality of points (e.g. 2 points) simultaneously and moving these touch positions closer together is called "Pinch-In", and a touch operation of moving these touch positions further apart is called "Pinch-Out". Pinch-In and Pinch-Out are collectively called a pinch operation (or simply "pinch"). For the touch panel 106a, various types of touch panels may be used, such as a resistive film type, a capacitive type, a surface acoustic wave type, an infrared type, an electro-magnetic induction type, an image recognition type and an optical sensor type. There are a type of detecting a touch when the touch panel is actually contacted, and a type of detecting a touch when a finger or pen approaches the touch panel, but either type may be used.

The camera unit 112 is a camera unit including an image pickup element (image sensor) constituted of a CCD or CMOS element to convert an optical image into electric signals. The camera unit 112 includes a lens group (image capturing lens) constituted of a zoom lens and a focus lens, a shutter having an aperture function, an image pickup element, an A/D convertor which converts analog signals outputted from the image pickup element into digital signals, and a barrier which covers the imaging system to prevent contamination and damage. The image processing unit 104 performs predetermined processing (e.g. pixel interpolation, such resizing as demagnification, color conversion) on the data which was imaged and acquired by the camera unit 112. Based on the operation result acquired by the image processing unit 104, the CPU 101 performs exposure control, distance measurement control and auto white balance (AWB) control. The image data for display, which was captured by the camera unit 112 and processed by the image processing unit 104, is displayed on the display 105. If the digital signals, which were captured by the camera unit 112 and converted by the A/D convertor and stored in the memory 102, are converted into analog signals by the D/A convertor and sequentially transferred and displayed on the display 105, live view (LV) display can be performed. Live view can be displayed in the still image capturing standby state, moving image capturing standby state and moving image recording state, and in LV display, the captured object image is displayed virtually in real-time. In accordance with the image capturing preparation instruction which the operation unit 106 performed based on the user operation, the CPU 101 controls the camera unit 112 and the image processing unit 104 to start such operations as auto focus (AF) processing, auto exposure (AE) processing and AWB processing. Responding to the image capturing instruction, the CPU 101 performs control to start a series of image capturing processing operations (main image capturing) where exposure is performed, signals are read from the image pickup element, a captured image is processed by the image processing unit 104 to generate an image file, and the image file is recorded in the storage medium 108. The image capturing instruction can be performed by the user operating the operation unit 106. The camera unit 112 can capture still images and moving images.

Figure 3:
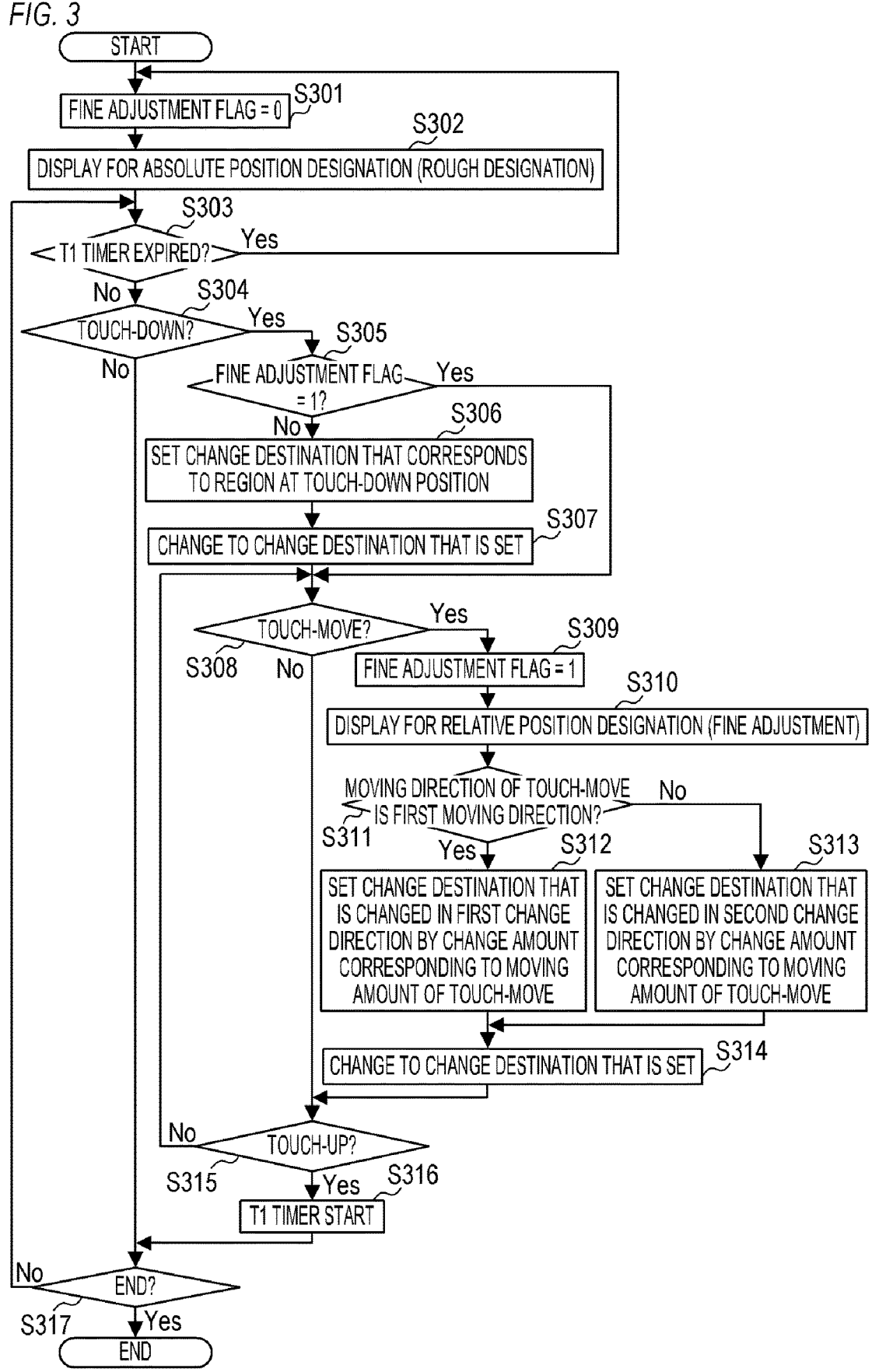
FIG. 3 is a flow chart of the processing to change a change target.

FIG. 3 is a flow chart of a processing to change a change target in accordance with the touch operation to the display surface (operation surface of the touch panel 106a) of the display 105. This processing is implemented by the CPU 101 developing a program, which is stored in the nonvolatile memory 103, in the memory 102, and executing the program. In this embodiment, a processing of changing a contact address displayed in accordance with the touch operation, where the change target is the contact address displayed out of a plurality of contact addresses registered in an address book, will be described as an example. However, the change target is not limited to this, and the present invention is applicable to the change processing of various other change targets. When a change target change screen is opened (in this embodiment, a contact address selection screen of the address book), the processing in FIG. 3 is started.

In S301, the CPU 101 initializes a fine adjustment flag held in the memory 102 to 0. Thereby a rough designation mode is selected. The rough designation mode is also called the absolute position designation mode.

The absolute position designation mode here is a designation mode in which the change target is changed to the change destination corresponding to the position of Touch-Down regardless the state of the change target before Touch-Down. In this embodiment, the later mentioned bar region 410 is divided into 5 regions in the major axis direction (vertical direction), and a change destination uniquely corresponds to each region respectively. If Touch-Down is performed on a bar region 410 (predetermined region), the change target is changed to the change destination corresponding to the region at the position of the Touch-Down. In the case of the example of a contact address, if Touch-Down is performed on the later mentioned bar region 410, the display portion, out of the contact address list, is changed to the portion corresponding to the region at the Touch-Down position, regardless which portion of the contact address list was displayed before the Touch-Down.

Designation modes also include the relative position designation mode. The relative position designation mode is a designation mode in which the change target is changed relative to the state of the change target before Touch-Move, by the change amount corresponding to the moving amount of Touch-Move from the position in the later mentioned bar region 420 (region at the same position as the bar region 410). In the relative position designation mode, even if Touch-Down is performed, the change target is not changed from the state before the Touch-Down unless Touch-Move is performed. The position in the major axis direction, in the bar region 420 (predetermined region), is not uniquely corresponded to each change destination, hence even if Touch-Move is performed from a same position for a same moving amount, the change target after the Touch-Move differs depending on the change target before the Touch-Move.

Figure 4A:
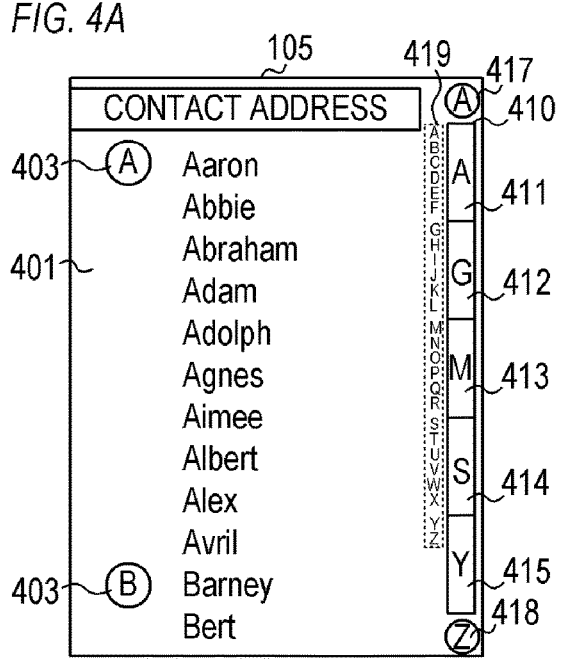
FIG. 4A to FIG. 4D are display examples to designate a position.

In S302, the CPU 101 performs display for designating the absolute position on the display 105, including the display of the bar region. FIG. 4A is an example of a display for designating the absolute position. In FIG. 4A, a contact address selection screen is displayed on the display 105. In a contact address display region 401, a part of contact addresses (part of the contact address list) registered in the address book is displayed. The contact addresses that are displayed are not all the contact addresses registered in the address book, but a part of the plurality of contact addresses. In this embodiment, 12 contact addresses can be displayed at a time. In the initial screen, the first 12 contact addresses, out of the contact addresses listed in alphabetical order, are displayed. By scrolling through the contact addresses, the contact addresses in the lower order can be displayed. If a name of a desired contact address is displayed in the contact address display region 401 and the displayed name is touched, the desired contact address can be selected to make a phone call or to send email. An index 403 is a guide display that indicates the first position of the contact addresses under each alphabetical listing, and by the index 403, the user can more easily identify which portion of the alphabet A to Z (contact addresses listed in alphabetical order) is currently displayed.

In FIG. 4A, a bar region 410, and bar region guides 417, 418 and 419 are displayed for designating the absolute position. In a rough designation mode (state of fine adjustment flag=0), the bar region 410 corresponds to a partial region on the operation surface of the touch panel 106a, and is divided into 5 regions (regions 411 to 415) in the major axis direction. The division number is an example and is not limited to 5. The region 411 corresponds to the beginning of the contact addresses starting with "A", the region 412 corresponds to the beginning of the contact addresses starting with "G", the region 413 corresponds to the beginning of the contact addresses starting with "M", the region 414 corresponds to the beginning of the contact addresses starting with "S", and the region 415 corresponds to the beginning of the contact addresses starting with "Y". Each range of the 12 contact addresses starting with other contact addresses (e.g. "Barney", which the beginning of the contact addresses starting with "B") cannot be displayed by Touch-Down along (specification of the absolute position alone), because Touch-Move is required, as described later. The bar region guide 417 is a guide display that indicates the top of the bar region 410 corresponding to "A" (beginning), and the bar region guide 418 is a guide display that indicates the bottom of the bar region 410 corresponding to "Z" (end). In other words, by the bar region guides 417 and 418, the user can visually identify that each position (Y coordinates) of the bar region 410 in the longer direction (vertical direction in the drawing, the major axis) generally corresponds to the contact addresses listed in alphabetical order from "A" to "Z". The bar region guide 419 is a guide display that indicates the alphabetic letter that belongs to each of the regions 411 to 415 in the bar region 410 (predetermined region). For example, it is assumed that the user searches for the contact address of "Randy". In the bar region 410, there is no region corresponding to "R", but "R" in the bar region guide 419 is displayed at a position that is close to the lower part of the region 413. Therefore, the user can check the bar region guide 419, and determine that the contact addresses under "M" are displayed by touching the region 413, then scrolling through the contact addresses to the "A" side. The user may also determine that the contact addresses under "S" are displayed first by touching the region 414, then scrolling through the contact addresses to the "Z" side. In each of the later mentioned display examples, it is assumed that a display element the same as FIG. 4A is denoted with a same reference sign.

In S303, the CPU 101 determines that timer T1, which started clocking in S316 (described later), expired. If the timer T1 expired, processing advances to S301, the fine adjustment flag is reset to 0, and the relative position designation mode (fine adjustment mode) is changed to the rough designation mode. Processing advances to S304 in the case where the timer T1 is clocking but has not expired, or in the case where the timer T1 did not start clocking (processing in S316 has not yet performed).

In S304, the CPU 101 determines whether Touch-Down was performed to the bar region 410 or the bar region 420. Processing advances to S305 if Touch-Down was performed to the bar region, or to S317 if not.

In S305, the CPU 101 determines whether the fine adjustment flag held in memory 102 is 1 (whether the relative position designation mode is set). Processing advances to S308 if the fine adjustment flag is 1 (if the relative position designation mode is set), or to S306 if not (if the rough designation mode is set).

Figure 4B:
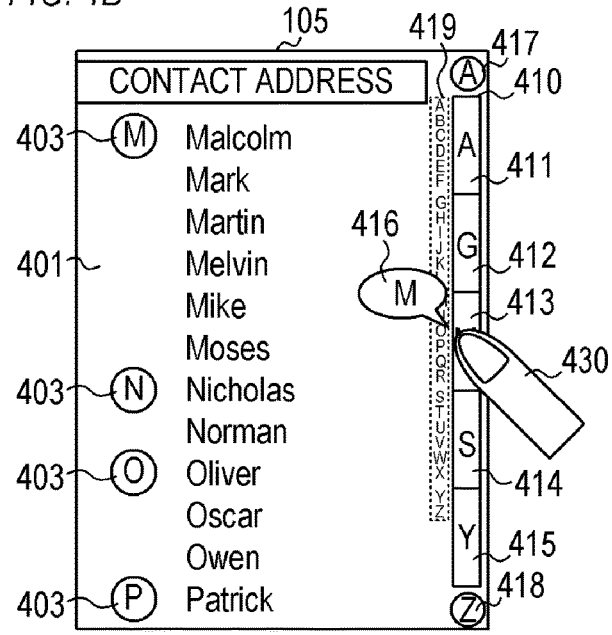

In S306, the CPU 101 sets a change destination corresponding to a region where Touch-Down was performed (region at Touch-Down position) out of the regions 411 to 415. For example, in the case where Touch-Down is performed in the region 413 in the state of FIG. 4A, as illustrated in FIG. 4B the range of display (change target) in the contact address list is set (determined) to the range of the 12 contact addresses starting with the beginning of "M" (Malcolm) corresponding to the region 413. At this time, a touch position guide 416, which visually shows the user that the touch down position is a position corresponding to the contact addresses starting with "M" out of the alphabetic letters A to Z, is also displayed. By viewing this, the user can confirm that the 12 contact addresses starting with Malcolm are displayed, because the Touch-Down position is the bar region 410 (Touch-Down in region 413 was performed).

In S307, the CPU 101 executes the change to the change destination which was set in S306. For example, the display content of the contact address display region 401 is updated from the content in FIG. 4A to the content in FIG. 4B.

In S308, the CPU 101 determines whether the finger touching the bar region 410 or the bar region 420 caused Touch-Move to be performed in the longer direction of the bar (vertical direction, major axis in FIG. 4A to FIG. 4D). Processing advances to S309 if Touch-Move moving in the longer direction was performed, or to S315 if not.

In S309, the CPU 101 sets the fine adjustment flag held in the memory 102 to 1. Thereby the relative position designation mode (fine adjustment mode) is set.

In S310, on the display 105, the CPU 101 performs display for designating the relative position, including the display of the bar region. The display for designating the relative position is a display of the bar region 420 in FIG. 4C, and a display of the bar region guides 427 and 428 (described later).

In S311, the CPU 101 determines whether the direction of the Touch-Move detected in S308 is the up direction (first moving direction). Processing advances to S312 if the Touch-Move direction is the up direction, or to S313 if the down direction (second moving direction, which is the opposite of the first moving direction).

In S312, the CPU 101 sets the change destination of the change target to the change destination in the first changing direction by the change amount corresponding to (e.g. in proportion to) the detected moving amount of the Touch-Move in the up direction. This change destination is set by the relative position designation. For example, a change destination, that is located before the current setting in the alphabetical order by the amount determined by multiplying the component of the moving amount of the Touch-Move in the up direction by a predetermined coefficient, is set. For example, in the case where the moving coefficient for each 1 cm is 2 (in the case where two contact addresses are changed at each 1 cm), if the moving component in the up direction is 0.5 cm, then the contact addresses to be displayed are set to a range closer to "A" by 0.5×2=1 contact address.

In S313, the CPU 101 sets the change destination of the change target to a change destination in the second change direction by the change amount corresponding to (e.g. in proportion to) the detected moving amount of the Touch-Move in the down direction. This change destination is set by the relative position designation. For example, a change destination, that is located after the current setting in the alphabetical order by the amount determined by multiplying the component of the moving amount of the Touch-Move in the down direction by a predetermined coefficient, is set. For example, in the case where the moving coefficient for each 1 cm is 2 (in the case where two contact addresses are changed at each 1 cm), if the moving component in the down direction is 1 cm, the contact address to be displayed is set to a range closer to "Z" by 1×2=2 contact addresses.

In S314, the CPU 101 executes the change to the change destination that is set in S312 or S313. Thereby the change target is relatively changed by the moving amount of Touch-Move.

In S315, the CPU 101 determines whether Touch-Up was performed. Processing advances to S316 if Touch-Up is performed, or returns to S308 to repeat the processing if Touch-Up was not performed.

In S316, the CPU 101 resets and starts clocking the timer T1. T1 is three seconds, for example. Before the timer T1 expires, S303, mentioned above, does not become Yes, hence the relative position designation mode is maintained. Therefore, by operating with continuously repeating Touch- Move multiple times, change in the relative position designation can be repeatedly executed. In other words, in the case where one Touch-Move operation is insufficient to reach the target change destination, the touching finger may be released in an attempt to perform Touch-Move again in the same direction. Even in such a case, in this embodiment, it is possible to prevent contact addresses in a range, which is unrelated to the display range before the operation, from being displayed by unintended absolute position designation. On the other hand, when T1 elapses from the Touch-Up, the mode automatically returns to the absolute position designation mode (rough designation mode). Therefore, after a series of continuous operations end, the display range can be quickly changed close to the target change destination intended by the user by the absolute position designation via Touch-Down.

In S317, the CPU 101 determines whether an end event (e.g. power OFF, shift to another operation mode) is generated. Processing advances to S303 to repeat the processing steps if the end event is not generated, or processing ends if the end event is generated.

Figure 4C:
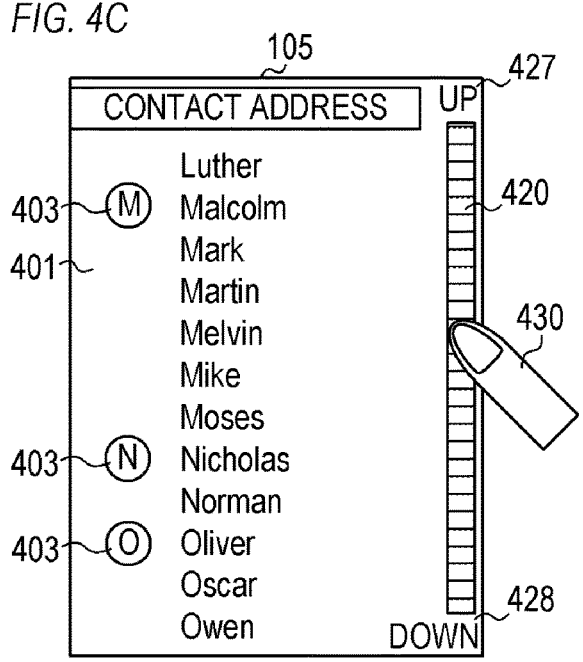

FIG. 4C is a display example in the case when the finger 430 moved (Touch-Move) in the up direction by 0.5 cm in the state in FIG. 4B. In this case, by the processing in S312, the change destination of the change target (contact addresses to be displayed) is set to a range, including the front side contact addresses (first change direction) in alphabetical order, by the one contact address of the change amount from the state before the change. Then by the processing in S314, scrolling is performed from the state in FIG. 4B to the state in FIG. 4C. As a result of scrolling, in FIG. 4C, 12 contact addresses (Luther to Owen), which are contact addresses to the "A" side by one contact address in alphabetical order, compared with the state in FIG. 4B, are displayed in the contact address display region 401. The scroll direction is downward, and the contact addresses displayed in the contact address display region 401 in FIG. 4B are shifted (scrolled downward) respectively by one contact address, and the one contact address on the side closer to "A" (Luther) is newly displayed. The bar region 420 in FIG. 4C has a different format from the bar region 410 displayed in FIG. 4B, and is a display item for designating a relative position. In this embodiment, it is assumed that the bar region 420 and the bar region 410 are at the same position, although the display formats are different from each other. The bar region guides 417 and 418 (guides indicating that the top of the bar region 410 corresponds to "A" (beginning), and the bottom thereof corresponds to "Z" (end)) displayed in FIG. 4B are not displayed in FIG. 4C, and the bar region guides 427 and 428 are displayed instead. The bar region guide 427 indicates that by Touch-Move in the up direction on the bar region 420, the displayed contact addresses can be relatively changed to the upper side (side closer to "A"), out of each contact address listed in alphabetical order "A" to "Z". The bar region guide 428 indicates that by Touch-Move in the down direction on the bar region 420, the displayed contact addresses can be relatively changed to the lower side (side closer to "Z") out of each contact address listed in alphabetical order "A" to "Z". The bar region 420 and the bar region guides 427 and 428 are indicators for designating the relative position displayed in S310.

Figure 4D:
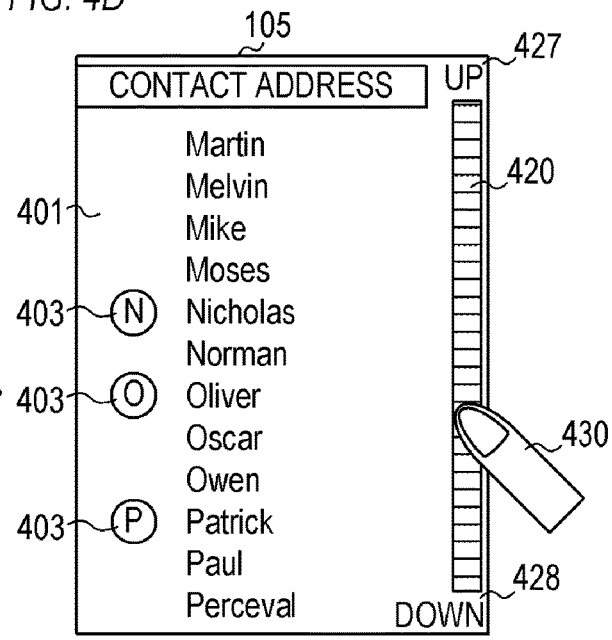

FIG. 4D is a display example in the case where the finger 430 moved (Touch-Move) in the down direction by 1 cm in the state of FIG. 4B. In this case, by the processing in S313, the change destination of the change target (contact addresses to be displayed) is set to a range, including the rear side contact addresses (second change direction) in alphabetical order, by the 2 contact addresses of the change amount from the state before the change. Then by the processing in S314, scrolling is performed from the state in FIG. 4B to the state in FIG. 4D. As a result of scrolling, in FIG. 4D, 12 contact addresses (Martin to Perceval), which are contact addresses closer to the "Z" side by two contact addresses in alphabetical order, compared with the state in FIG. 4B, are displayed in the contact address display region 401. The scrolling direction is the up direction, and the contact addresses displayed in the contact address display region 401 in FIG. 4B are respectively shifted (scrolled upward) by two contact address, and the two contact addresses on the side closer to "Z" (Paul and Perceval) are newly displayed. In FIG. 4D as well, the bar region 420 is displayed instead of the bar region 410, and the bar region guides 427 and 428 are displayed instead of the bar region guides 417 to 419.

FIG. 5A is a display example in the case where the finger 430 further moved (Touch-Move) in the down direction in the state of FIG. 4D. In this case, the finger 430 touches the lowest part of the bar region 420, but the contact addresses around "Z" are not displayed, and the change target (contact addresses to be displayed) is relatively changed to the rear side contact address from the state of FIG. 4D, since the mode is not the absolute position designation but the relative position designation.

FIG. 5B is a display example in the case where Touch-Up is performed in the state of FIG. 5A, and the timer T1 has not expired. In this case, the relative position designation mode is maintained, hence the bar region 420 and the bar region guides 427 and 428 do not return to the bar region 410 and the bar region guides 417 to 419.

FIG. 5C is a display example in the case where Touch-Down is performed in the state of FIG. 5B, before the timer T1 expires (in the state where relative position designation mode is continuously set). In this case, the finger 430 touches the highest part of the bar region 420, but the contact addresses around "A" are not displayed, and the change target (contact addresses to be displayed) is not changed from the state of FIG. 5B before the Touch-Down, since the mode is not the absolute position designation but the relative position designation. In other words, contact addresses in the same range as FIG. 5B are displayed.

FIG. 5D is a display example in the case where the finger 430 moved (Touch-Move) in the down direction in the state of FIG. 5C. In this case, the finger 430 touches the same position as FIG. 4B, but the same range as FIG. 4B (around "M") is not displayed, and the change target (contact addresses to be displayed) is relatively changed to the rear side from the state of FIG. 5C, since the mode is not the absolute position designation but the relative position designation.

FIG. 5E is a display example in the case where the timer T1 has expired in the state of FIG. 5B without performing touching. In this case, it is determined that S303 is Yes, processing advances to S301, and setting returns to the absolute position designation mode, hence the bar region 420 and the bar region guides 427 and 428 return to the bar region 410 and the bar region guides 417 to 419.

FIG. 5F is a display example when Touch-Down is performed in the region 414 of the bar region 410 in the state of FIG. 5E. In this case, the finger 430 touches the same position as FIG. 4D, but the same range as FIG. 4D is not displayed, and the 12 contact addresses from the beginning of the contact address starting with "S" corresponding to the region 414 are displayed, since the mode is not the relative position designation but the absolute position designation.

As described above, according to this embodiment, if the first type of operation (Touch-Down), which does not involve movement of an input position, is performed, change is performed in the first designation mode (rough designation mode) in which specific change target (contact addresses to be displayed) is changed to the change destination corresponding to the region to which the inputted position is corresponded (any one of regions 411 to 415). If the second type of operation (Touch-Move), which moves the input position while continuing the input operation (continuing the touched state), is performed, change is performed in the second designation mode (relative position designation mode) in which the same change target (contact addresses to be displayed) is changed from the change destination changed in the rough designation mode by a change amount based on the moving amount of the input position. In the rough designation mode, if Touch-Down is performed to the region 413 (first divided region), for example, the contact addresses to be displayed are changed to the 12 contact addresses starting with Malcolm (first change destination) (FIG. 4B). In the rough designation mode, if Touch-Down is performed to the region 414 (second divided region) adjacent to the region 413, for example, the contact addresses to be displayed are changed to the 12 contact addresses starting with Samantha (second change destination), which are closer to "Z" (first change direction side) compared with the 12 contact addresses starting with Malcolm (FIG. 5F). If Touch-Move (operation to move the input position) is performed in the down direction in the state where Touch-Down is performed to the region 413 (first divided region) and the 12 contact addresses starting with Malcolm (first change destination) are displayed (FIG. 4B), the contact addresses to be displayed are changed to the 12 contact addresses starting with Martin (third change destination), which are closer to "A" (second change direction side) compared with the 12 contact addresses starting with Samantha (second change destination). The 12 contact addresses starting with Martin (third change destination) are closer to "Z" compared with the 12 contact addresses starting with Malcolm (first change destination).

In this way, the user can perform rough designation of the change destination of the change target and fine adjustment with better operability, and the change target can be quickly changed to the desired change destination with higher certainty. For example, in the case where the user is searching for the contact address of Randy, a number of times of operation to repeat Touch-Move in the downward direction increases if Randy is searched in relative position designation from "A" in alphabetical order. In this embodiment, however, the range of the contact addresses starting with "M" (range in FIG. 4B), which is close to Randy, can be quickly displayed by performing Touch-Down to the region 413. Then Randy can be displayed merely by performing fine adjustment of the display range (twice that of Touch-Move, as indicated in FIG. 4B, FIG. 5A, FIG. 5B, FIG. 5C and FIG. 5D) in the relative position designation by Touch-Move.

In the relative position designation of this embodiment, the change target is relatively changed by the change amount determined by the Touch-Move amount in the major axis direction of the bar region by a predetermined coefficient, regardless a number of candidates of the change destination (in this embodiment, a number of registered contact addresses) of the change target. Therefore, regardless the number of candidates of the change destinations, the fine adjustment can be performed with constant operability. To calculate the change amount, it is preferable that the coefficient, by which the Touch-Move amount is multiplied, is determined as follows.

(1) A coefficient is determined so that the change amount of the change target, in accordance with the Touch-Move from one end to the other end of the bar region in the major axis direction, becomes a change amount that is smaller than the total number of candidates of the charge destination of the change target. This is because fine adjustment is easier than the case of corresponding the entire change destinations of the change target to the positions of the bar region in the major axis direction in the absolute position designation mode.

(2) A coefficient is determined so that the change amount of the change target, in accordance with Touch-Move performed from one end to the other end of the bar region in the major axis direction, or from the center of one divided region (e.g. center of region 413) to the center of the adjacent divided region (e.g. center of region 414), is smaller than the change amount from the change destination, which is changed by performing Touch-Down to one divided region (e.g. region 413) in the rough setting mode, to the change destination, which is changed by performing Touch-Down to an adjacent divided region (e.g. region 414). This is because fine adjustment is easier than the case of the rough designation mode.

In the example in FIG. 3, the change target is changed during the touch operation (during Touch-On), but may be changed when Touch-Up is performed. In this case, the processing steps of S307 and S314 are omitted, and the change target is changed to the last change destination which was set in S306, S312 or S313, immediately after Yes is determined in S315. At this time, in S312 and S313, a change destination, to be relatively changed from the change destination, which was set in the previous processing, is set respectively.

Figure 6:
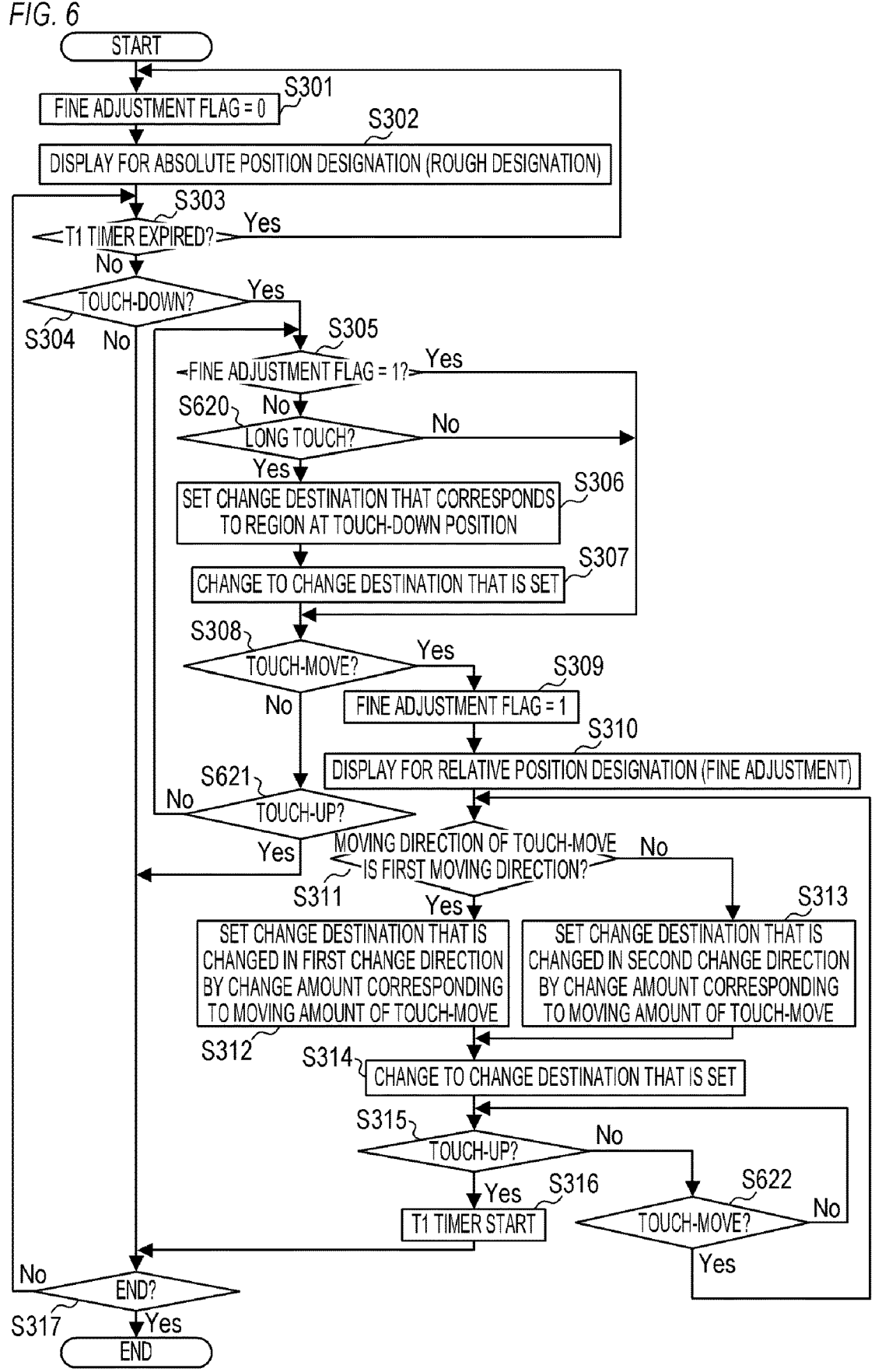
FIG. 6 is a modification of the flow chart of the processing to change the chart target.

In the example in FIG. 3, the rough designation is performed by Touch-Down, but the rough designation may be performed by a touch operation that does not involve movement of the touch position (e.g. long touch, tap operation which performs Touch-Up after touch without moving, touch push which touches and pushes with pressure exceeding a threshold without moving). For example, FIG. 6 is a processing flow in the case of performing the rough designation (absolute position designation) by long touch. In FIG. 6, a step the same as FIG. 3 is denoted with the same reference sign. The processing flow in FIG. 6 that is different from FIG. 3 will be described in detail, with omitting the description on the portion that is the same as FIG. 3.

The processing in S301 to S305 are performed, and processing advances to S620 if the determination result in S305 is No (fine adjustment flag=0; rough designation mode). In S620, the CPU 101 determines whether long touch was performed to the bar region 410 (whether the time since Touch-Down exceeded threshold time (e.g. 1 second) in S304). If long touch was performed, the change target is changed in the rough designation mode (processing steps in S306 and S307 are performed), and processing advances to S308, and if long touch was not performed, processing advances to S308 without changing the change target (without performing the processing in S306 and S307).

If the determination result in S308 is No (no Touch-Move), processing advances to S621, and the CPU 101 determines whether Touch-Up was performed. Processing advances to S317 if Touch-Up was performed, or to S305 if not.

If the determination result in S308 is Yes (Touch-Move was performed), the change target is changed in the relative position designation mode (processing steps in S309 to S314 are performed), and processing advances to S315. If the determination result in S315 is No (no Touch-Up), processing advances to S622, and the CPU 101 determines whether Touch-Move was performed. Processing advances to S311 if Touch-Move was performed, or returns to S315 is not.

In the example described above, the bar region 410 in the rough designation mode is divided into 5, however the number of divisions is not limited to 5, whereas the bar region 410 may be divided into 26 so that each alphabetic letter from "A" to "Z" corresponds to each of the 26 regions respectively. If the Japanese language is used, the bar region 410 in the rough designation mode may be divided into 10, so that 10 characters, "a", "ka", "sa", "ta", "na", "ha", "ma", "ya", "ra" and "wa" (first characters of each column of the Japanese syllabary in "aiueo" order) correspond to the 10 regions respectively.

In the example described above, the change target of the change operation is the contact addresses to be displayed, but the present invention is also applicable to the case of changing other specific change targets which the user may desire a quick adjustment and fine adjustment. For example, the present invention is applicable to changing a frame to be displayed in one moving image, changing the sound volume, changing a musical piece to be reproduced, changing image capturing parameters, e.g. ISO sensitivity and shutter speed, and changing image processing parameters, e.g. brightness adjustment value, and color adjustment value. Furthermore, the present invention is applicable to the change operation to change various parameters, such as the date, time and seconds of the time setting, and a page to be displayed in a document.

Figure 7A:
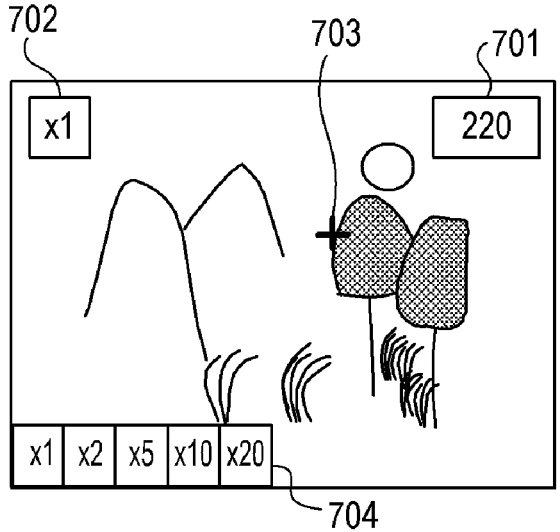
FIG. 7A to FIG. 7C are display examples where the change target is the display magnification of the image.
Figure 7B:
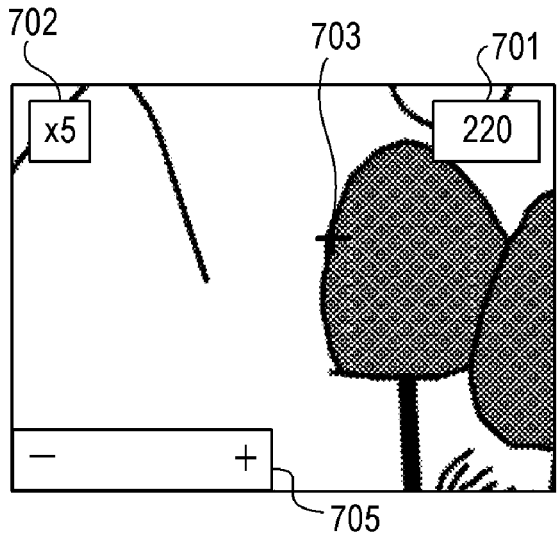
Figure 7C:
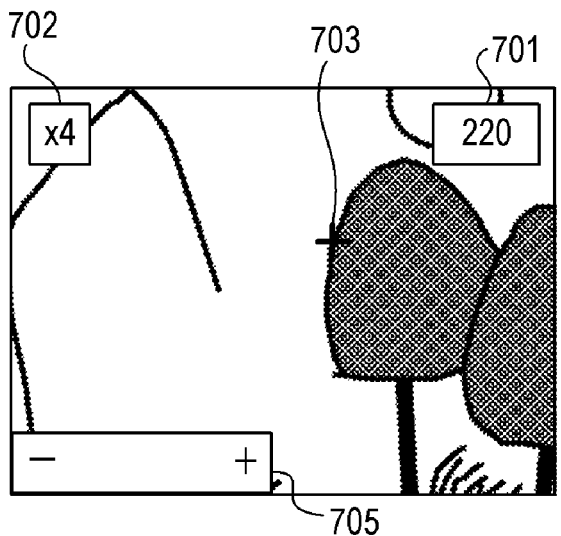

An example of applying the present invention to a change operation, of which change target is the display magnification (magnification ratio) of the image, will be described with reference to FIG. 7A, FIG. 7B and FIG. 7C. FIG. 7A, FIG. 7B and FIG. 7C are states when an image (e.g. captured image) stored in the non-volatile memory 103 or storage medium 108 is reproduced and displayed on the display 105. The following operation is also possible in the live view display.

FIG. 7A is a display example in the absolute position designation mode (rough designation mode). In FIG. 7A, guides 701 to 703 and a bar region 704 are displayed besides the reproduced image. The guide 701 indicates information on the reproduced image, where "220" is displayed in FIG. 7A, which indicates that the $220^{th}$ image is currently reproduced. The guide 702 indicates the current display magnification of the reproduced image, where "×1", i.e., 1:1 ratio, is displayed in FIG. 7A. The guide 703 is displayed in a reference position (center position) when the display magnification of the reproduced image is changed. When the change of the display magnification is instructed, the reproduced image is magnified or demagnified with the position of the guide 703 as the center. The bar region 704 is divided into 5 regions in the major axis direction. 5 display magnification values are corresponded to the 5 regions respectively, and if Touch-Down is performed to one of the 5 regions, the display magnification of the reproduced image is changed to the display magnification corresponding to the region to which Touch-Down is performed. In the 5 regions, "×1" which corresponds to a 1:1 ratio (display magnification), "×2" which corresponds to a 2:1 ratio, "×5" which corresponds to a 5:1 ratio, "×10" which corresponds to a 10:1 ratio, and "×20" which corresponds to a 20:1 ratio are displayed respectively. Thereby the user can easily understand the correspondence of the region to which Touch-Down is performed and the display magnification to which the current magnification is changed. For example, the user can understand that if Touch-Down is performed to the region where "×5" is displayed, the display magnification of the reproduced image is changed to a 5:1 ratio.

FIG. 7B is a display example in the relative position designation mode. In FIG. 7B, the bar region 704 in FIG. 7A is changed to the bar region 705. Further, "×5" in the guide 702 indicates that the current display magnification is a 5:1 ratio. The user can perform fine adjustment of the display magnification for a reproduced image by performing Touch-Move to the left and right on the bar region 705. The adjacent amount is an amount in accordance with the moving amount of Touch-Move. "+" is displayed at the right end of the bar region 705, and "−" is displayed at the left end of the bar region 705 respectively. Thereby the user can understand that the display magnification is increased by performing Touch-Move from left to right, and the display magnification is decreased by performing Touch-Move from right to left.

FIG. 7C is a display example in the case where Touch-Move is performed from right to left in the state of FIG. 7B. By performing Touch-Move from right to left, the display magnification of the reproduced image is changed from a 5:1 ratio to a 4:1 ratio (display magnification that cannot be designated in the absolute position designation mode), and this information is displayed as "×4" in the guide 702.

Figure 8A:
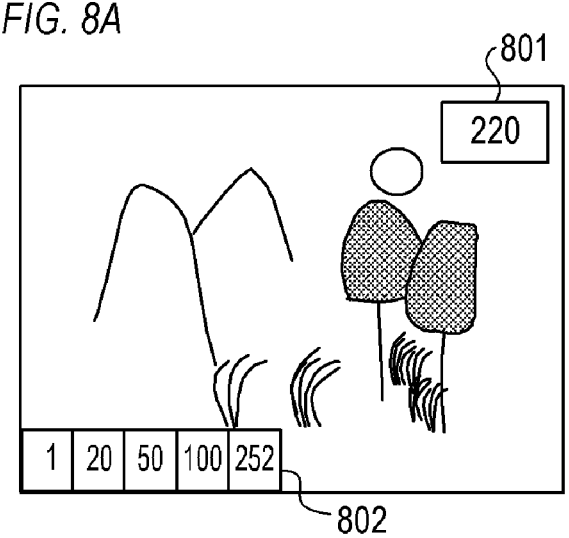
FIG. 8A to FIG. 8C are display examples where the change target is an image to be displayed.
Figure 8B:
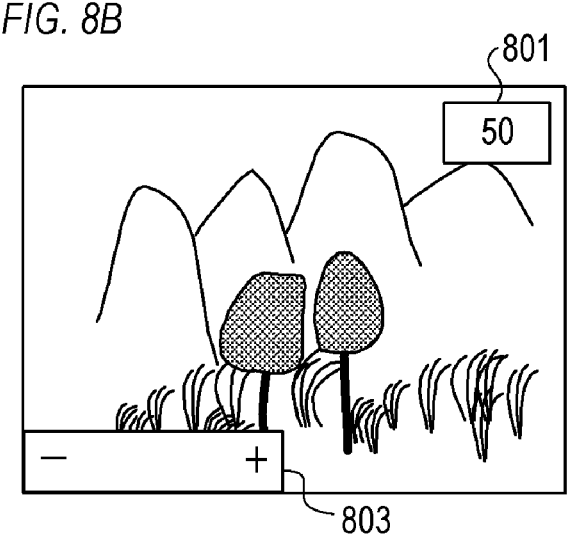
Figure 8C:
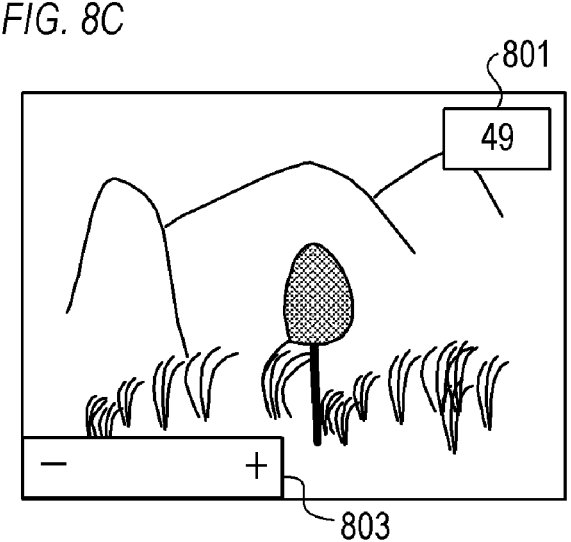

An example of applying the present invention to a change operation of which change target is an image to be displayed, out of a plurality of stored images (image forward/backward processing, processing to switch image file of still image or moving image) will be described with reference to FIG. 8A, FIG. 8B and FIG. 8C. FIG. 8A, FIG. 8B and FIG. 8C are states when an image (e.g. captured image) stored in the non-volatile memory 103 or storage medium 108 is reproduced and displayed on the display 105. The following operation can also be performed as an operation to change the reproducing position (time-based position to start reproduction) of a moving image, or as an operation to change the reproducing position of music.

FIG. 8A is a display example in the absolute position designation mode (rough designation mode). In FIG. 8A, a guide 801 and a bar region 802 are displayed beside the reproduced image. The guide 801 indicates information on the reproduced image, where "220" is displayed in FIG. 8A, which indicates that the 220th image, out of the stored 252 images, is currently reproduced. The bar region 802 is divided into 5 regions in the major axis direction. Five numbers are assigned to the 5 regions respectively, and if Touch-Down is performed to one of the 5 regions, the reproduced image is changed to an image with a number corresponding to the region to which Touch-Down is performed. In the 5 regions, "1" which corresponds to the first (initial) image, "20" which corresponds to the 20th image, "50" which corresponds to the 50th image, "100" which corresponds to the 100th image, and "252" which corresponds to the 252nd (last) image are displayed. Thereby the user can easily understand the correspondence of the region to which Touch-Down is performed, and the number of image that the current reproduced image is changed to. For example, the user can understand that if Touch-Down is performed to the region in which "50" is displayed, the reproduced image is changed to the 50th image.

FIG. 8B is a display example in the relative position designation mode. In FIG. 8B, the bar region 802 in FIG. 8A is changed to the bar region 803. Further, "50" in the guide 801 indicates that the currently reproduced image is the 50th image. The user can switch the reproduced image more precisely by performing Touch-Move to the left and right of the bar region 802. The switching amount (number of switched images) is an amount in accordance with the moving amount of Touch-Move. "+" is displayed at the right end of the bar region 802, and "−" is displayed at the left end of the bar region 802 respectively. Thereby the user can understand that the reproduced image is switched to the next image by performing Touch-Move from left to right, and the reproduced image is returned to the previous image by performing Touch-Move from right to left.

FIG. 8C is a display example in the case where Touch-Move is performed from right to left in the state of FIG. 8B. By performing Touch-Move from right to left, the reproduced image is changed to the previous page (49th image: image that cannot be designated in absolute position designation mode), and this information is displayed as "49" in the guide 801.

The operation to change a specific change target is not limited to the touch operation to the touch panel 106*a*. Furthermore, the present invention is applicable to an electronic apparatus other than a smartphone. For example, the present invention is applicable to an operation using a mouse, regarding Touch-Down as a click (pressing the mouse button), Touch-Move as dragging, and Touch-Up as a cancel click (cancel by pressing the mouse button).

Figure 9A:
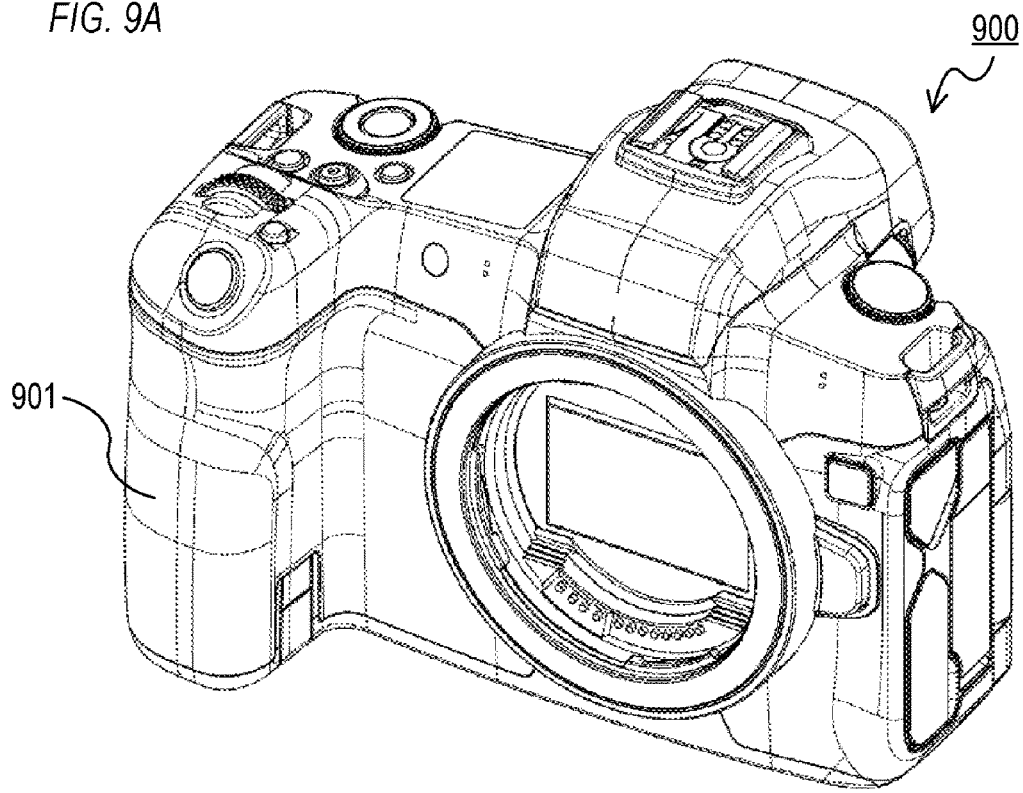
FIG. 9A and FIG. 9B are external views of a digital camera.
Figure 9B:
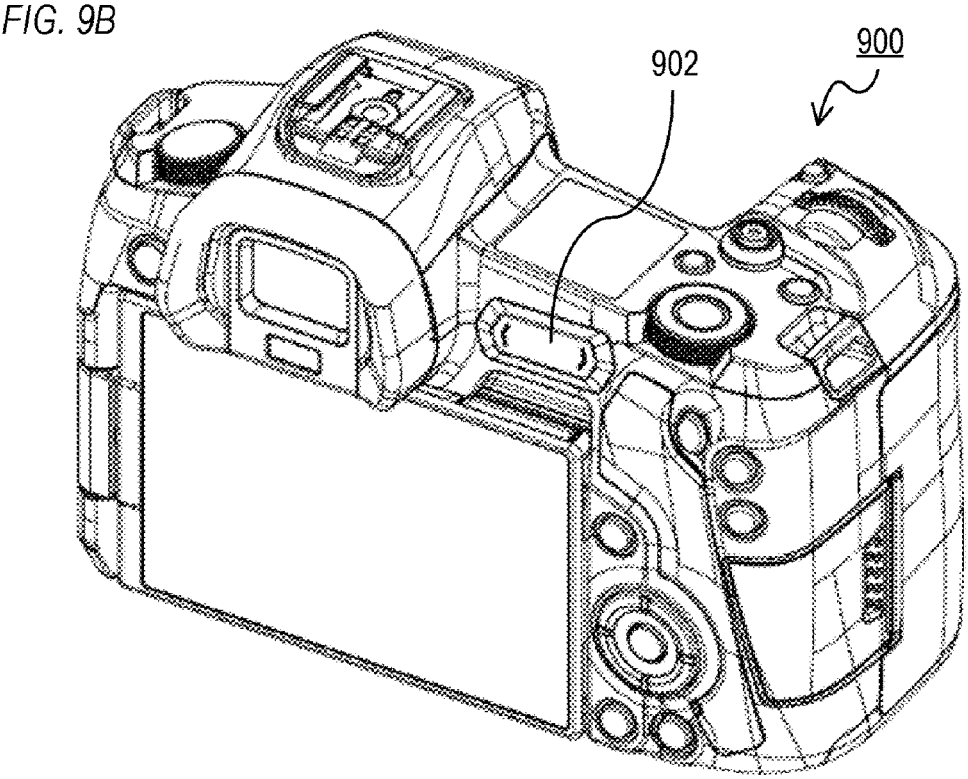

The present invention is also applicable to a digital camera 900 illustrated in FIG. 9A and FIG. 9B. FIG. 9A is a front perspective view of the digital camera 900, and FIG. 9B is a rear perspective view of the digital camera 900. A grip 901 is a holding unit having a shape for the user to easily hold the digital camera 900 with their right hand. A touch bar 902 (multifunction bar: M-Fn bar) is a linear touch operation member (line touch sensor) which can receive touch operation. The touch bar 902 is disposed at a position where the thumb of the right hand, holding the grip 901 in a natural way (recommend by manufacturer), can operate by touching. The touch bar 902 can receive operations performed on the touch bar 902, such as a tap operation (touching and releasing within a predetermined period without moving), and slide operation to the left and right, (moving the touch position in a touched state). Unlike the touch panel, the touch bar 902 has no display function. The present invention is applicable to a touch operation on the touch bar 902.

The region that is operated to change the specific change target is not limited to the bar-shaped region (e.g. bar regions 410, 420, 704, 705, 802, 803), but the present invention is applicable to operation on a region that is not bar-shaped (region that is not rectangular).

For example, the present invention is applicable in the case where the change target is the position of the mouse pointer on the screen of a notebook PC, and the position of the mouse pointer is designated using a touch pad (rectangular two-dimensional operation area) included in the notebook PC. In this case, in the absolute position designation mode, the rectangular two-dimensional operation region is divided into a plurality of zones (e.g. 9 regions (3 rows by 3 columns)), and each region is corresponded to 9 locations on the screen (e.g. each center of the 9 regions (3 rows×3 columns) on the screen). If Touch-Down is performed to the touch pad, the mouse pointer is moved to the position on the screen corresponding to the region at the touched position, regardless the position of the mouse pointer before the Touch-Down. Then in accordance with Touch-Move performed with maintaining the touched state, the position of the mouse pointer is finely adjusted in the relative position designation mode (the moving coefficient is set to be sufficient smaller than the moving amount in the absolute position designation mode). This operation is also applicable to a case of moving the position of the AF frame displayed on the display unit of the finder in the digital camera, by the touch operation on the rear surface touch panel outside the finder.

While the present invention has been described with reference to the preferred embodiments, the present invention is not limited to these specific embodiments, and includes various modes within the scope that does not depart from the essence of the invention. Each of the above mentioned embodiments is merely an example of the invention, and may be combined as required.

In the above description, various controls mentioned above are performed by the CPU 101, but may be performed by one hardware component or by a plurality of hardware components (e.g. a plurality of processors and circuits) which share the processing to control the entire apparatus. In the above embodiment, a case of applying the present invention to a smartphone was described as an example, but the present invention is not limited to this, but is applicable to any electronic apparatus which can receive operation to input a position. For example, the present invention is applicable to a personal computer, PDA, portable telephone terminal, portable image viewer, printer, digital photo frame, music player, game machine, electronic book reader and video player. The present invention is also applicable to a display device (including a projection device), tablet terminal, digital camera, AI speaker, home electronic device, on-vehicle device and medical equipment.

According to this disclosure, the rough specification and fine adjustment of the change destination of the change target can be performed with better operability.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-184450, filed on Oct. 7, 2019, which is hereby incorporated by reference herein in its entirety.

What is claimed is:

1. An electronic apparatus comprising:
an input device configured to receive an input operation of a position; and
at least one memory and at least one processor which function as:
a control unit configured to perform control such that
a change in a first designation mode is performed in accordance with that the input device receives a first type of operation without moving an input position in a predetermined region, wherein in the change in the first designation mode, a specific change target is changed to a change destination that corresponds to a region to which the input position in the first type of operation belongs, and
a change in a second designation mode is performed in accordance with that the input device receives a second type of operation of moving the input position in the predetermined region, wherein in the change in the second designation mode, the specific change target is changed to a change destination that differs, by a change amount based on a movement amount in the second type of operation, from the change destination that is changed in the first type of operation,
wherein in the first designation mode,
the specific change target is changed to a first change destination in accordance with reception of the first type of operation for a first divided region in the predetermined region, and
in accordance with reception of the first type of operation for a second divided region, which is adjacent to the first divided region in a first change direction side in the predetermined region, the specific change target is changed to a second change destination, which is located on the first change direction side of the first change destination, and
in the second designation mode,
in accordance with reception of the second type of operation of moving the input position in the first change direction from a state, where the first type of operation for the first divided region is received and where the specific change target is changed to the first change destination, the specific change target is changed to a third change destination, which is located on the first change direction side of the first change destination and on a second change direction side of the second change destination, the second change direction side being opposite to the first change direction side;
wherein in the second designation mode, the specific change target is relatively changed by the change amount in accordance with the movement amount in the second type of operation on the predetermined region by a predetermined coefficient, the predetermined coefficient being determined so that the change amount of the specific change target, in accordance with the movement amount in the second type of operation from one end to a second end of the predetermined region in the first change direction, becomes a change amount that is smaller than the total number of candidates of a change destination of the specific change target.

2. The electronic apparatus according to claim 1, wherein in the second designation mode, in accordance with reception of the second type of operation of moving the input position to a position corresponding to the second divided region, from the state where the first type of operation for the first divided region is received and from the state where the specific change target is changed to the first change destination, the control unit changes the specific change target to the third change destination.

3. The electronic apparatus according to claim 1, wherein, in the second designation mode, the change amount for changing the specific change target in accordance with reception of the second type of operation of moving the input position in the first change direction, by a same distance as a distance from a center of the first divided region to a center of the second divided region, is smaller than a change amount from the first change destination to the second change destination.

4. The electronic apparatus according to claim 1, wherein the specific change target is not changed to the third change destination in accordance with the first type of operation in the first designation mode.

5. The electronic apparatus according to claim 1, wherein the input device receives a touch operation on an operation surface.

6. The electronic apparatus according to claim 5, wherein the predetermined region is a region on the operation surface.

7. The electronic apparatus according to claim 1, wherein the input device is a mouse.

8. The electronic apparatus according to claim 1, wherein the predetermined region is a bar-shaped region.

9. The electronic apparatus according to claim 8, wherein
in the predetermined region, different change destinations of the specific change target are associated, sequentially in the first change direction, with a plurality of divided regions respectively, which are aligned in the first change direction, and
the first divided region and the second divided region are included in the plurality of divided regions.

10. The electronic apparatus according to claim 1, wherein the at least one memory and at least one processor further function as a display control unit configured to perform control such that a guide relating to the predetermined region is displayed.

11. The electronic apparatus according to claim 10, wherein a display format of the guide is differentiated between the first designation mode and the second designation mode.

12. The electronic apparatus according to claim 1, wherein the specific change target is any one of a contact address to be displayed out of a plurality of registered contact addresses, a display magnification of an image, and an image to be displayed out of a plurality of stored images.

13. The electronic apparatus according to claim 1, wherein the specific change target is a specific parameter.

14. The electronic apparatus according to claim 13, wherein the specific parameter is any one of an image capturing parameter, an image processing parameter, a reproducing position of a moving image or music, sound volume, date, time and seconds.

15. A control method of an electronic apparatus, comprising:
- a receiving step of receiving an input operation of a position; and
- a control step of performing control such that
- a change in a first designation mode is performed in accordance with that a first type of operation without moving an input position in a predetermined region is received in the receiving step, wherein in the change in the first designation mode, a specific change target is changed to a change destination that corresponds to a region to which the input position in the first type of operation belongs, and
- a change in a second designation mode is performed in accordance with that a second type of operation of moving the input position in the predetermined region is received in the receiving step, wherein in the change in the second designation mode, the specific change target is changed to a change destination that differs, by a change amount based on a movement amount in the second type of operation, from the change destination that is changed in the first type of operation,
- wherein in the first designation mode,
- the specific change target is changed to a first change destination in accordance with reception of the first type of operation for a first divided region in the predetermined region, and
- in accordance with reception of the first type of operation for a second divided region, which is adjacent to the first divided region in a first change direction side in the predetermined region, the specific change target is changed to a second change destination, which is located on the first change direction side of the first change destination, and
- in the second designation mode,
- in accordance with reception of the second type of operation of moving the input position in the first change direction from a state, where the first type of operation for the first divided region is received and where the specific change target is changed to the first change destination, the specific change target is changed to a third change destination, which is located on the first change direction side of the first change destination and on a second change direction side of the second change destination, the second change direction side being opposite to the first change direction side;
- wherein in the second designation mode, the specific change target is relatively changed by the change amount in accordance with the movement amount in the second type of operation on the predetermined region by a predetermined coefficient, the predetermined coefficient being determined so that the change amount of the specific change target, in accordance with the movement amount in the second type of operation from one end to a second end of the predetermined region in the first change direction, becomes a change amount that is smaller than the total number of candidates of a change destination of the specific change target.

16. A non-transitory computer readable medium that stores a program, wherein
the program causes a computer to execute a control method of an electronic apparatus, including:
- a receiving step of receiving an input operation of a position; and
- a control step of performing control such that
- a change in a first designation mode is performed in accordance with that a first type of operation without moving an input position in a predetermined region is received in the receiving step, wherein in the change in the first designation mode, a specific change target is changed to a change destination that corresponds to a region to which the input position in the first type of operation belongs, and
- a change in a second designation mode is performed in accordance with that a second type of operation of moving the input position in the predetermined region is received in the receiving step, wherein in the change in the second designation mode, the specific change target is changed to a change destination that differs, by a change amount based on a movement amount in the second type of operation, from the change destination that is changed in the first type of operation,
- in the first designation mode,
- the specific change target is changed to a first change destination in accordance with reception of the first type of operation for a first divided region in the predetermined region, and
- in accordance with reception of the first type of operation for a second divided region, which is adjacent to the first divided region in a first change direction side in the predetermined region, the specific change target is changed to a second change destination, which is located on the first change direction side of the first change destination, and
- in the second designation mode,
- in accordance with reception of the second type of operation of moving the input position in the first change direction from a state, where the first type of operation for the first divided region is received and where the specific change target is changed to the first change destination, the specific change target is changed to a third change destination, which is located on the first change direction side of the first change destination and on a second change direction side of the second change destination, the second change direction side being opposite to the first change direction side;
- wherein in the second designation mode, the specific change target is relatively changed by the change amount in accordance with the movement amount in the second type of operation on the predetermined region by a predetermined coefficient, the predetermined coefficient being determined so that the change amount of the specific change target, in accordance with the movement amount in the second type of operation from one end to a second end of the predetermined region in the first change direction, becomes a change amount that is smaller than the total number of candidates of a change destination of the specific change target.

17. The electronic apparatus according to claim 1, wherein the second type of operation is performed in the first change direction corresponding to a direction in which the first divided region and the second divided region are aligned.

18. The electronic apparatus according to claim 1, wherein the first type of operation and the second type of operation are performed on a same region of an operating surface.

* * * * *